L. S. PFOUTS.
PASTEURIZER.
APPLICATION FILED NOV. 20, 1911.
1,189,478.  Patented July 4, 1916.
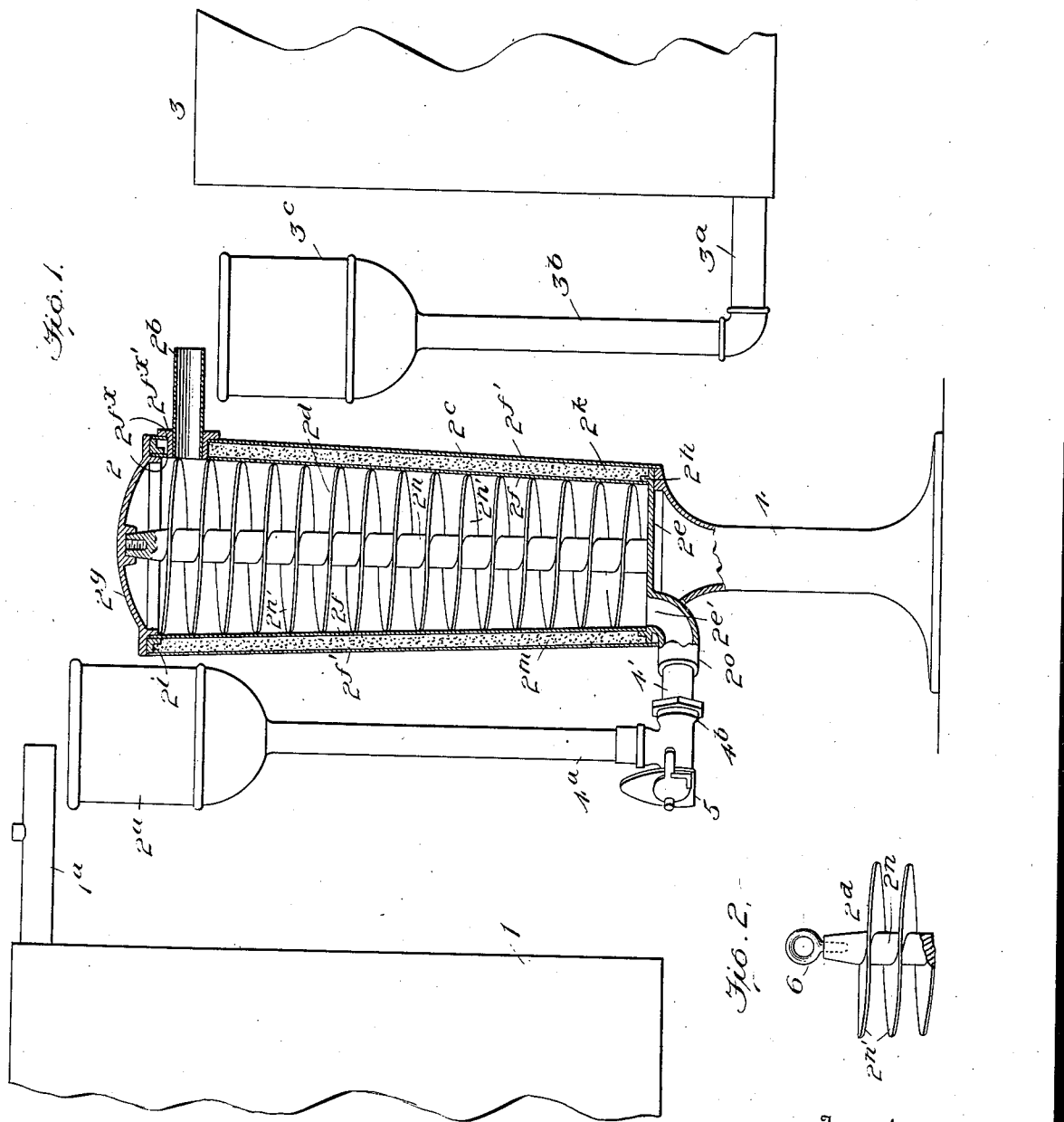

UNITED STATES PATENT OFFICE.

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

PASTEURIZER.

1,189,478.  Specification of Letters Patent.  Patented July 4, 1916.

Application filed November 20, 1911. Serial No. 661,338.

*To all whom it may concern:*

Be it known that I, LEROY S. PFOUTS, a citizen of the United States, residing at Canton, in the county of Stark and State of Ohio, have invented certain new and useful Improvements in and Relating to Pasteurizers, of which the following is a specification.

This invention relates to apparatus for treating liquid, such as milk, and effecting a pasteurization thereof.

The invention relates more particularly to a pasteurizing apparatus provided with mechanism in which the milk, after it is heated to the necessary temperature required, is held at substantially that temperature for a predetermined or variable period of time before being cooled.

For the purpose of illustration, I have, in the accompanying drawings, shown and herein described one form of apparatus embodying my invention.

Figure 1 illustrates an apparatus, in section, embodying my invention, in connection with a heating apparatus and a cooling apparatus. Fig. 2 is a fragmentary elevation of the helical member.

In the drawings, 1 indicates as an entirety a heater which may be of any ordinary or preferred form of construction, such a heater for example as is described and claimed in Letters Patent of the United States No. 878,225 to John C. Miller, dated February 4, 1908. The purpose of the heater is to heat the milk or other material to any predetermined temperature. The milk is supplied to the heater in any desired manner (not shown). The heater is provided with a discharge spout or nozzle $1^a$ from which the milk is preferably delivered to a receiving funnel $2^a$ of a holding apparatus 2, which will be presently described.

3 indicates as an entirety an apparatus for cooling the milk immediately after it is treated in and has passed through the holder 2. The cooler may be constructed in any suitable way, for example as illustrated in the above referred to patent to John C. Miller, although it will be understood that any other preferred form of suitable cooler may be used. The cooler is provided with an inlet $3^a$ at its lower portion.

$3^b$ indicates a feed pipe connected with said inlet $3^a$ and carrying at its upper end a receiving funnel $3^c$ to which the milk is fed from a discharge nozzle $2^b$ at the upper end of the holder 2. As will be readily understood from the drawings, the discharge nozzle from the holder 2 is preferably arranged in a plane below the discharge nozzle of the heater, but above the receiving funnel $3^c$ of the cooler 3 so that the milk will flow from the heater to the holder and from the latter to the cooler under the influence of gravity. The milk may be discharged from the cooler in any suitable manner (not shown in the drawing).

4 indicates a pedestal or standard of suitable height. It is preferably provided with an enlarged upper end which serves as a base or support for the holder 2. The holder 2 comprises a casing $2^c$, preferably arranged vertically, and a helical member $2^d$ arranged within and extending from end to end of said casing. As will be understood from the drawing, the circumferential edges of the helical member coöperate with the inner cylindrical wall of the casing to form a continuous tortuous passageway for the milk from the bottom to the top of said casing. The casing $2^c$ consists of a bottom $2^e$ formed with an inlet opening $2^{e'}$ for the milk, a pair of tubular members $2^f$, $2^{f'}$, arranged concentrically one within the other, the walls of which preferably taper from their upper to their lower ends, and a removable cover $2^g$ which tightly closes the open end of the casing $2^c$.

$2^h$ indicates an annulus provided on the upper face of the bottom $2^e$, and serving to position the lower end of the inner tubular member $2^f$. The tubular member $2^f$ may be fixed to the annulus $2^h$ in any suitable way so as to form a liquid tight joint.

$2^i$ indicates an annular spacing member arranged between and at the upper ends of the tubular members $2^f$, $2^{f'}$. It operates to rigidly position the upper end of the inner tubular member $2^f$. As shown, the tubular members $2^f$, $2^{f'}$ are of a size relative to each other to form a space $2^k$ between them which is closed at its upper end by the member $2^i$, and at its lower end by the bottom $2^e$. This space may be filled with some suitable material that is a non-conductor of heat, such as cork, as indicated at $2^m$. The helical member preferably consists of an axial rod $2^n$ around which a fin or web $2^{n'}$ extends in the form of a helix. The helical fin extends from end to end of the rod $2^n$. The rod $2^n$ and fin 2ⁿ' are preferably formed integral. The helical member 2ᵈ may be formed in one section. It is of tapering form from end to end so as to fit the inner tapering wall of the casing, and permit ready insertion in place within the casing as well as removal therefrom, besides facilitating in the construction of the apparatus as an entirety.

2° indicates an inlet pipe, which may be formed integral with the bottom 2ᵉ and communicating with the opening 2ᵉ' therein.

4' indicates a pipe connected with the inlet pipe 2°.

4ᵃ indicates a pipe connected at its upper end with the receiving funnel 2ᵃ and connected at its lower end by a coupling 4ᵇ with the outer end of the pipe 4'.

5 indicates a valve, provided in the coupling 4ᵇ. The purpose of this valve is to permit the removal or discharge of any material remaining in the chamber 2ᶜ at the end of the operation of the apparatus. It also serves as a simple means for flushing, or draining the holder chamber when it is cleaned.

2ᶠˣ, 2ᶠˣ, indicate a pair of alined openings formed in the upper ends of the tubular members 2ᶠ, 2ᵗ', and adapted to receive a collar 2ᶠˣ' through which the delivery nozzle 2ᵇ extends. The collar 2ᶠˣ' is preferably soldered at its inner end to the wall of the inner tubular member to form a liquid tight connection. The discharge nozzle may be connected to the collar in any well known manner.

It will be understood that in apparatus of this character it is highly desirable that they should be so constructed as to be readily disassembled for the purpose of thoroughly cleaning all of the parts with which the material to be pasteurized comes into contact. In the embodiment of my invention illustrated it is to be noted that upon removal of the helical member from the holder chamber 2ᶜ all of the surfaces of that chamber and the walls of the ducts leading therefrom may be readily gotten at for cleaning purposes and of course the helix itself may be easily cleaned when it is removed from the casing. Its removal may be accomplished in any suitable manner; for example, the rod 2ⁿ may be formed with a screw-threaded recess at its upper end to receive the screw-threaded rod of a lifting device 6, which may be quickly inserted or removed, as desired. When this device is in place, a crane or other device suitable for the purpose may be employed for lifting the helix from the chamber.

In the process of pasteurization of milk, or other liquid, wherein provision is made for holding the milk for a given length of time after it has been heated and before it is cooled, various sorts of holding mechanisms have been utilized. However, with all of the earlier devices of this character of which I am aware, either a plurality of holding tanks have been employed or if a single tank has been used, its construction in addition to the construction of the mechanism placed therein in order to cause the liquid treated to take a roundabout or circuitous path has been of such nature as not to lend itself to easy cleaning for sanitary purposes. It will be noted that the tapered helix in my construction serves to form with the walls of the holding chamber a circuitous or tortuous passageway of relatively great length as compared with the depth of the holding tank itself. Having the rate of discharge from the heater to the holder determined, the length and capacity of this tortuous passageway may be determined so that a particle of milk entering the passageway at the bottom will be delivered from the top thereof in substantially a predetermined period of time.

To those skilled in the art of making apparatus of the class described, many alterations in construction and widely differing embodiments and applications of my invention will suggest themselves, without departing from the spirit and scope thereof. My disclosures and the description therein are purely illustrative, and are not intended to be in any sense limiting.

What I claim is:

1. In apparatus of the character described, the combination of a chamber closed at opposite ends and having side walls that taper toward one end, a helical member mounted in said chamber and tapering from end to end, its peripheral edge fitting the tapering side walls of the chamber and forming a circuitous passageway for liquid from end to end of the chamber, means for supplying liquid to one end of said chamber, and a discharge conduit at the opposite end of said chamber leading therefrom at right angles to the longitudinal axis of said chamber.

2. In apparatus of the character described, the combination of a chamber closed at opposite ends and having side walls that taper toward one end, a helical member mounted in said chamber and tapering from end to end, its peripheral edge fitting the tapering side walls of the chamber and forming a circuitous passageway for liquid from end to end of the chamber, means for supplying liquid to one end of said chamber, and a discharge conduit at the opposite end of said chamber leading therefrom at right angles to the longitudinal axis of said chamber substantially in the plane of one coil of said member.

3. In an apparatus for treating liquids, an annular casing arranged vertically and having sides that taper from its upper end to its lower end, a bottom for closing the lower end of said casing, a helical member removably mounted in said casing and tapering from end to end, its peripheral edge fitting the tapering sides of said casing, a removable top for said casing having engagement with but being detachable from said helical member, and means for supplying liquid at the bottom of said casing and discharging it from the top of the tortuous passageway.

4. The combination of a casing comprising two vertical tubular members having sides which taper from their upper ends to their lower ends, the said tubular members being arranged concentrically one within the other, a bottom for closing the lower ends of said tubular members, an annulus carried by said bottom and arranged to space the lower end of the inner tubular member from the outer tubular member, a ring interposed between and spacing the upper ends of said tubular members from each other, a top, and a helical web extending from end to end of said casing, the peripheral edge of said web engaging the wall of the inner tubular member and coöperating therewith to form a circuitous passageway, the said casing being formed with inlet and outlet openings leading from its opposite ends.

5. The combination of a casing comprising two vertical tubular members having sides which taper from their upper ends to their lower ends, said tubular members being arranged concentrically one within the other, a bottom for closing the lower end of said tubular members, means for spacing the opposite ends of said tubular members from each other, a top, and a helical web extending from end to end of said casing, the peripheral edge of said web engaging the wall of the inner tubular member and coöperating therewith to form a circuitous passageway, the said casing being formed with inlet and outlet openings leading from its opposite ends and the outlet opening extending through the walls of said tubular members and having its inner end arranged between two coils of said web.

In testimony whereof I affix my signature, in the presence of two witnesses.

LEROY S. PFOUTS.

Witnesses:
  WILLIAM H. MILLER,
  JOHN H. BISHOP.